(12) United States Patent
Couckuyt et al.

(10) Patent No.: US 8,060,297 B2
(45) Date of Patent: Nov. 15, 2011

(54) ROUTE TRANSFER BETWEEN DEVICES

(75) Inventors: Jeffrey D. Couckuyt, Bothell, WA (US);
Neil W. Black, Seattle, WA (US); John C. Krumm, Redmond, WA (US);
Ruston Panabaker, Redmond, WA (US); Ivan J. Tashev, Kirkland, WA (US); Michael Lewis Seltzer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 671 days.

(21) Appl. No.: 11/957,182

(22) Filed: Dec. 14, 2007

(65) Prior Publication Data

US 2009/0157583 A1   Jun. 18, 2009

(51) Int. Cl.
*G01C 21/00* (2006.01)
*H04W 4/02* (2009.01)

(52) U.S. Cl. .................. 701/200; 340/944; 340/995.12; 455/456.3

(58) Field of Classification Search .. 340/995.1–995.28, 340/944; 701/200–302; 455/3.04, 456.1–457
See application file for complete search history.

(56) References Cited

U.S. PATENT DOCUMENTS

| | | | |
|---|---|---|---|
| 4,884,208 A * | 11/1989 | Marinelli et al. | 701/300 |
| 4,939,663 A | 7/1990 | Baird | |
| 5,187,667 A | 2/1993 | Short | |
| 5,422,813 A | 6/1995 | Schuchman et al. | |
| 5,504,482 A | 4/1996 | Schreder | |
| 5,629,854 A | 5/1997 | Schulte | |
| 5,648,768 A * | 7/1997 | Bouve | 340/988 |
| 5,774,073 A | 6/1998 | Maekawa et al. | |
| 5,802,492 A | 9/1998 | DeLorme et al. | |
| 5,938,720 A | 8/1999 | Tamai | |
| 5,987,381 A | 11/1999 | Oshizawa | |
| 6,060,989 A | 5/2000 | Gehlot | |
| 6,119,065 A | 9/2000 | Shimada et al. | |
| 6,199,009 B1 | 3/2001 | Meis et al. | |
| 6,199,045 B1 * | 3/2001 | Giniger et al. | 705/1.1 |
| 6,249,742 B1 | 6/2001 | Friederich et al. | |
| 6,253,980 B1 | 7/2001 | Murakami et al. | |
| 6,317,686 B1 * | 11/2001 | Ran | 701/210 |
| 6,321,158 B1 | 11/2001 | DeLorme et al. | |

(Continued)

FOREIGN PATENT DOCUMENTS

EP    1519288 A2    3/2005

(Continued)

OTHER PUBLICATIONS

MAPQUEST Business Solutions Advantage API™ http://cdn.mapquest.com/corpb2b/bsolutions-advantageapi-pdf-whitepaper.pdf. Last accessed Oct. 4, 2007, 22 pages.

(Continued)

*Primary Examiner* — Mark Hellner
*Assistant Examiner* — Ari M Diacou
(74) *Attorney, Agent, or Firm* — Shook, Hardy & Bacon L.L.P.

(57) ABSTRACT

A user can intend to travel between different locations and employ different traveling manners to reach an intended travel destination. At different points, different devices can be employed for disclosing a route. For instance, as a user walks, a route can be integrated into a personal electronic device, such as a cellular telephone. An evaluation can take place that due to specific route details, for example detailed text, a particular device would be superior for presentment over another.

6 Claims, 10 Drawing Sheets

U.S. PATENT DOCUMENTS

| | | |
|---|---|---|
| 6,339,746 B1 | 1/2002 | Sugiyama et al. |
| 6,374,182 B2 | 4/2002 | Bechtolsheim et al. |
| 6,381,535 B1 * | 4/2002 | Durocher et al. ............. 701/202 |
| 6,381,538 B1 | 4/2002 | Robinson et al. |
| 6,415,226 B1 | 7/2002 | Kozak |
| 6,470,267 B1 | 10/2002 | Nozaki |
| 6,510,379 B1 | 1/2003 | Hasegawa et al. |
| 6,526,350 B2 | 2/2003 | Sekiyama |
| 6,542,811 B2 | 4/2003 | Doi |
| 6,553,313 B1 | 4/2003 | Froeberg |
| 6,567,743 B1 | 5/2003 | Mueller et al. |
| 6,571,216 B1 | 5/2003 | Garg et al. |
| 6,622,087 B2 | 9/2003 | Anderson |
| 6,636,145 B1 | 10/2003 | Murakami et al. |
| 6,640,187 B1 | 10/2003 | Chenault et al. |
| 6,687,608 B2 * | 2/2004 | Sugimoto et al. ............. 701/207 |
| 6,697,730 B2 | 2/2004 | Dickerson |
| 6,711,474 B1 | 3/2004 | Treyz et al. |
| 6,721,654 B2 | 4/2004 | Akiyama |
| 6,778,903 B2 | 8/2004 | Robinson et al. |
| 6,785,607 B2 | 8/2004 | Watanabe et al. |
| 6,813,501 B2 | 11/2004 | Kinnunen et al. |
| 6,826,472 B1 | 11/2004 | Kamei et al. |
| 6,829,532 B2 | 12/2004 | Obradovich |
| 6,847,889 B2 | 1/2005 | Park et al. |
| 6,865,482 B2 | 3/2005 | Hull |
| 6,871,137 B2 | 3/2005 | Scaer et al. |
| 6,898,517 B1 | 5/2005 | Froeberg |
| 6,952,559 B2 | 10/2005 | Bates et al. |
| 6,965,325 B2 | 11/2005 | Finnern |
| 6,993,326 B2 | 1/2006 | Link, II et al. |
| 7,016,307 B2 | 3/2006 | Vasudev et al. |
| 7,027,915 B2 | 4/2006 | Craine |
| 7,043,356 B2 | 5/2006 | Linn |
| 7,058,506 B2 | 6/2006 | Kawase et al. |
| 7,062,376 B2 | 6/2006 | Oesterling |
| 7,069,308 B2 | 6/2006 | Abrams |
| 7,076,409 B2 | 7/2006 | Agrawala et al. |
| 7,080,139 B1 | 7/2006 | Briggs et al. |
| 7,092,819 B2 | 8/2006 | Odachi et al. |
| 7,103,368 B2 | 9/2006 | Teshima |
| 7,149,625 B2 | 12/2006 | Mathews et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,239,960 B2 | 7/2007 | Yokota |
| 7,245,925 B2 | 7/2007 | Zellner |
| 7,250,907 B2 | 7/2007 | Krumm et al. |
| 7,286,837 B2 * | 10/2007 | Giniger et al. ............. 455/456.3 |
| 7,295,805 B2 | 11/2007 | Walker et al. |
| 7,308,236 B2 | 12/2007 | Fukushima |
| 7,376,414 B2 | 5/2008 | Engstrom |
| 7,403,905 B2 | 7/2008 | Shioda et al. |
| 7,466,986 B2 * | 12/2008 | Halcrow et al. ............. 455/456.2 |
| 7,496,484 B2 | 2/2009 | Agrawala et al. |
| 7,512,487 B1 | 3/2009 | Golding et al. |
| 7,522,995 B2 | 4/2009 | Nortrup |
| 7,587,273 B2 | 9/2009 | Ohnishi et al. |
| 7,624,024 B2 | 11/2009 | Levis et al. |
| 2001/0014849 A1 | 8/2001 | King et al. |
| 2001/0020211 A1 * | 9/2001 | Takayama et al. ............. 701/200 |
| 2001/0025222 A1 * | 9/2001 | Bechtolsheim et al. ...... 701/209 |
| 2001/0037271 A1 | 11/2001 | Kubota |
| 2001/0044321 A1 * | 11/2001 | Ausems et al. ............. 455/556 |
| 2001/0044693 A1 | 11/2001 | Gotou et al. |
| 2002/0004700 A1 | 1/2002 | Klein |
| 2002/0032035 A1 | 3/2002 | Teshima |
| 2002/0055872 A1 | 5/2002 | LaBrie et al. |
| 2002/0084917 A1 | 7/2002 | Hauptman |
| 2002/0097193 A1 | 7/2002 | Powers |
| 2002/0107027 A1 | 8/2002 | O'Neil |
| 2002/0121981 A1 | 9/2002 | Munch |
| 2002/0124050 A1 | 9/2002 | Middeljans |
| 2002/0169540 A1 | 11/2002 | Engstrom |
| 2002/0184091 A1 | 12/2002 | Pudar |
| 2003/0023371 A1 * | 1/2003 | Stephens ............. 701/209 |
| 2003/0043045 A1 | 3/2003 | Yasushi et al. |
| 2003/0093216 A1 | 5/2003 | Akiyama |
| 2003/0135304 A1 | 7/2003 | Sroub et al. |
| 2003/0158650 A1 | 8/2003 | Abe et al. |
| 2003/0182183 A1 | 9/2003 | Pribe |
| 2004/0076279 A1 | 4/2004 | Taschereau |
| 2004/0088392 A1 * | 5/2004 | Barrett et al. ............. 709/223 |
| 2004/0117195 A1 | 6/2004 | Bodin |
| 2004/0117246 A1 | 6/2004 | Applebaum |
| 2004/0158433 A1 | 8/2004 | Wimschneider et al. |
| 2004/0204848 A1 | 10/2004 | Matsuo et al. |
| 2004/0233045 A1 | 11/2004 | Mays |
| 2005/0085997 A1 | 4/2005 | Park |
| 2005/0125148 A1 | 6/2005 | Van Buer et al. |
| 2005/0132024 A1 | 6/2005 | Habaguchi et al. |
| 2005/0140524 A1 | 6/2005 | Kato et al. |
| 2005/0165762 A1 | 7/2005 | Bishop |
| 2005/0197764 A1 | 9/2005 | Wolf |
| 2005/0216182 A1 | 9/2005 | Hussain et al. |
| 2005/0267651 A1 | 12/2005 | Arango |
| 2006/0058947 A1 | 3/2006 | Schalk |
| 2006/0074531 A1 * | 4/2006 | Saarinen et al. ............. 701/25 |
| 2006/0095374 A1 | 5/2006 | Lo et al. |
| 2006/0123053 A1 | 6/2006 | Scannell |
| 2006/0129313 A1 | 6/2006 | Becker et al. |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0235739 A1 | 10/2006 | Levis et al. |
| 2006/0241859 A1 | 10/2006 | Kimchi et al. |
| 2006/0241862 A1 | 10/2006 | Ichihara et al. |
| 2006/0247852 A1 | 11/2006 | Kortge et al. |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0005233 A1 | 1/2007 | Pinkus et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0050279 A1 | 3/2007 | Huang et al. |
| 2007/0061057 A1 | 3/2007 | Huang et al. |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 * | 5/2007 | Eichenbaum et al. ........ 701/211 |
| 2007/0128900 A1 | 6/2007 | Bauman |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0176796 A1 * | 8/2007 | Bliss et al. ............. 340/995.14 |
| 2007/0203644 A1 | 8/2007 | Thota et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0244627 A1 | 10/2007 | Boss et al. |
| 2007/0250259 A1 | 10/2007 | Dare |
| 2007/0257792 A1 * | 11/2007 | Gold ............. 340/539.2 |
| 2007/0293958 A1 | 12/2007 | Stehle et al. |
| 2008/0033644 A1 | 2/2008 | Bannon |
| 2008/0046134 A1 | 2/2008 | Bruce et al. |
| 2008/0046165 A1 | 2/2008 | Downs et al. |
| 2008/0200312 A1 | 8/2008 | Tagliabue |
| 2008/0293430 A1 | 11/2008 | Blom et al. |
| 2008/0312819 A1 | 12/2008 | Banerjee |
| 2009/0005973 A1 | 1/2009 | Salo |
| 2009/0012703 A1 | 1/2009 | Aso et al. |
| 2009/0048771 A1 | 2/2009 | Speier et al. |
| 2010/0036610 A1 | 2/2010 | Urciuoli et al. |

FOREIGN PATENT DOCUMENTS

| | | |
|---|---|---|
| EP | 1659368 A1 | 5/2006 |
| JP | 2002156234 A | 5/2002 |
| KR | 1020060016832 A | 2/2006 |
| WO | WO0002389 A1 | 1/2000 |

| | | | |
|---|---|---|---|
| WO | WO0108413 A1 | 2/2001 |
| WO | 2003042950 A1 | 5/2002 |
| WO | W00239367 A1 | 5/2002 |
| WO | 2003019478 A1 | 3/2003 |
| WO | W003063521 A2 | 7/2003 |
| WO | WO2004084437 A1 | 9/2004 |
| WO | 2005024667 A1 | 3/2005 |
| WO | 2007131225 A2 | 11/2007 |

OTHER PUBLICATIONS

Route Guidance 'That Won't Replace One Jam with Another', m.logistics, Man/Jun. 2005, Issue 17. http://www.mlogmag.com/magazine/17/route-guidance.shtml. Last accessed Oct. 4, 2007, 3 pages.

New Magellan (Thales) MAESTRO4000 Vehicle Navigation System http://cgi.ebay.com/New-MAESTRO4000-Vehicle-Navigation-System-980919-01_W0QQitemZ110163915037QQihZ001 QQcategoryZ73332QQ cmdZViewItem. Last accessed Oct. 4, 2007, 5 pages.

Moshe Ben-Akiva, et al. Development of a Route Guidance Generation System for Real-Time Application http://rosowww.epfl.ch/mbi/papers/chania.pdf. Last accessed Apr. 10, 2007, 6 pages.

W. -T. Balke, et al. A Situation-aware Mobile Traffic Information System http://www.l3s.de/~balke/paper/hicss03.pdf. Last accessed Apr. 10, 2007, 10 pages.

Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/content/Promo/g3006_07.pdf. Last accessed Oct. 4, 2007, 6 pages.

Alan Mislove, et al. Exploiting Social Networks for Internet Search http://www.mpi-sws.mpg.de/~amislove/publications/PeerSpective-HotNets.pdf. Last accessed Oct. 3, 2007, 6 pages.

Sergi Marti, et al. DHT Routing Using Social Links. http://iptps04.cs.ucsd.edu/papers/marti-social.pdf. Last accessed Oct. 3, 2007, 6 pages.

Antonio Kruger, et al. The Connected User Interface: Realizing a Personal Situated Navigation Service. IUI'04, Jan. 13-16, 2004, Madeira, Funchal, Portugal. ACM 1-58113-815-6/04/0001 www.medien.ifi.lmu.de/pubdb/publications/pub/butz2004userinterface/butz2004userinterface.pdf. Last accessed Oct. 3, 2007, 8 pages.

Managing Demand Through Travel Information Services, U.S. Department of Transportation, Federal Highway Administration http://ops.fhwa.dot.gov/publications/manag_demand_tis/travelinfo.htm. Last accessed Oct. 3, 2007, 33 pages.

Boualem Benatallah, et al. OCEAN—Scalable and Adaptive Infrastructure for On-board Information Access, UNSW-CSE-TR-0601, Jan. 2006. http://www.cse.unsw.edu.au/~llibman/papers/unsw601.pdf. Last accessed Oct. 3, 2007, 14 pages.

N. Hristova, et al. Ad-Me: A Context-Sensitive Advertising System http://www.cs.ucd.ie/csprism/publications/Ericsson-UCD/HriAdme01ii.pdf. Last accessed Oct. 3, 2007, 10 pages.

Alessandra Agostini, et al. Integrated Profile Management for Mobile Computing http://webmind.dico.unimi.it/papers/Al2IA.pdf. Last accessed Oct. 3, 2007, 5 pages.

MPOS AdSpace http://www.xiam.com/xiam.products.adspace.shtml. Last accessed Oct. 5, 2007, 1 page.

Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.

Toshihiro Osaragi, et al. Map Element Extraction Model for Pedestrian Route Guidance Map http://ieeexplore.ieee.org/xpl/freeabs_all.jsp?arnumber=1532626. Last accessed Oct. 3, 2007, 10 pages.

S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Ltd. The Netherlands. http://www.pedestrians.tudelft.nl/publications/TR%20B%2004%20rc.pdf. Last accessed Oct. 3, 2007, 22 pages.

Alexandra Millonig, et al. Developing Landmark-Based Pedestrian Navigation Systems, Digital Object Identifier 10.1109/TITS.2006.889439, 1524-9050, IEEE Transactions on Intelligent Transportation Systems, vol. 8, No. 1, Mar. 2007. http://ieeexplore.ieee.org/xpl/freeabs_all.jsp?arnumber=1520046. Last accessed Oct. 3, 2007, 7 pages.

Srihari Narsimhan, et al. Methods for Optimal Pedestrian Task Scheduling and Routing http://www.cs.nott.ac.uk/~rxq/PlanSIG/narasimhan.pdf. Last accessed Oct. 3, 2007, 8 pages.

Gunther Retscher, et al. NAVIO—A Navigation and Guidance Service for Pedestrians. Journal of Global Positioning Systems (2004), vol. 3, No. 1-2: 208-217 http://www.gmat.unsw.edu.au/wang/jgps/v3n12/v3n12p26.pdf. Last accessed Oct. 3, 2007, 10 pages.

About Amaze, 2000-2007 LocatioNet Systems Ltd http://www.amazegps.com/docs/amAze_UM_en%203.1.pdf. Last accessed Oct. 4, 2007, 37 pages.

ROUTE 66 Mobile 7 for Nokia Series 60 Mobile Phones Launched in North America, Dec. 8, 2005, St. Louis, MO. http://www.66.com/route66/news.php?cid=US&sec=0&ssec=9&news=555. Last accessed Oct. 4, 2007, 2 pages.

Vijoy Pandey, et al. Exploiting User Profiles to Support Differentiated Services in Next-Generation Wireless Networks. Jul. 15, 2002 http://networks.cs.ucdavis.edu/~ghosal/Research/publications/vijoy-profiling-network-magazine.pdf. Last accessed Oct, 4, 2007, 23 pages.

Non-Final Office Action mailed Jun. 13, 2011 in U.S. Appl. No. 12/033,690.

Non-Final Office Action mailed May 27, 2011 in U.S. Appl. No. 11/957,139.

International Search Report with Written Opinion dated Aug. 24, 2009 (PCT/US2009/030377).

Franziska Klugl, et al. Route Decision Behaviour in a Commuting Scenario: Simple Heuristics Adaptation and Effect of Traffic Forecast. Journal of Artificial Societies and Social Simulation vol. 7, No. 1. Published: Jan. 31, 2004. http://jasss.soc.surrey.ac.ukl71111.html. Last accessed Dec. 11, 2007, 21 pages.

"Field Service Route Optimization for Energy and Cost Efficiency" http://www.californiagreensolutions.com/cgi-bin/glItpl.h,content=381. Last accessed Dec. 10, 2007, 2 pages.

Modelling the impact of incentives on route choice and traffic safety using a route choice simulator experiment http://www.aida.utwente.nl/NieuwsNacancLAIDA-STOK_pilol.whlinkl. Last accessed Dec. 10, 2007,7 pages.

Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425 http://repositories.cdlib.org/cgi/viewcontenl.cgi?article=1254&context=its/path. Last accessed Dec. 7, 2007, 48 pages.

Christine M. Johnson. The National ITS Program: Where We've Been and Where We're Going http://66.1 02.1.1 04/scholar?hl=en&lr=&q=cache:fIK6zDerzTQJ:plan20p. fhwa.dol.gov/pdfs/Pdfl/Edl03531.pdf. Last accessed Dec. 11, 2007, 12 pages.

Federal Highway Administration FHWA Domestic Pedestrian Safety Scanning Tour, Sep. 2005. http://66. 1 02.1 .1 04/scholar?h l=en&lr=& q=cache :3cGz2QG EKH kJ :www.cdtcmpo.org/bike/pedsafety.pdf. Last accessed 12111107, 64 pages.

Lisa J. Molnar, et al. Developing Information Systems for the Driving Tourist: A Literature Review, Feb. 1996. http://66.1 02.1.1 04/scholar?hl=en&lr=&q=cache:GJzx9CvxhCQJ:sambuca.umdl.umich.edu:80801/handle/2027.42/1160. Last accessed Dec. 11, 2007, 81 pages.

Martin O'Hara. Automated Congestion Charge Payment Scheme Using Smartnav Intelligent Satellite Navigation System, Apr. 13, 2005. Last accessed Dec. 11, 2007, 7 pages. http://www.tridatacom.co. ukiDownloads/papers/Papers/RI N%20Congestion%20 130405.pdf.

James Baring. The Solution to the Traffic Congestion Problem, Dec. 1, 2006. http://revelstoke.org.uklgsmpccs.htm. Last accessed Dec. 11, 2007, 5 pages.

Atlanta Unveils Traffic Reduction Plan, posted Aug. 28, 2007. http://www.environmentaldefense.org/article .cfm?contentl 0=6812. Last accessed Dec. 11, 2007, 1 page.

"Goncalo Correia, et al. Car Pooling Clubs: Solution for the Affiliation Problem in Traditional/Dynamic Ridesharing Systems http://www.iasi.cnr.itlewgtl16conference/ID92.pdf. 6 pages."

"Pilot Tests of Dynamic Ridesharing, updated Jan. 23, 2007. http://www.ridenow.org/ridenow_summary.html. Last accessed Dec. 11, 2007, 35 pages."

"iCarpool http://www.icarpool.com/enITransportationPlanner.htm. Last accessed Dec. 11, 2007, 2 pages."

"Ecolane Dynamic CarpoolTM, Ecolane Finland Oy 2006. http://www.ecolane.com/services/carpool/index.html. Last accessed 12/11107, 1 page."

"Route Planner, vol. 3—Modules, (Route Planner—Sep. 6, 2002—LA-UR-00-1767—TRANSIMS 3.0). http://ndssl.vbi.v1.edu/PublicationsITransimsVol3Ch4.pdf. Last accessed Dec. 11, 2007, 60 pages."

"Meredith Williams. Reduce Stress and Stay Organized While Running Errands http://www.microsoft.com/athome/intouch/directions.mspx. Last accessed Dec. 11, 2007, 3 pages."

"TomTom Itinerary Planning http://www.gpsreview.netItomtom-itinerary-planning/. Last accessed Dec. 11, 2007, 12 pages."

Non-Final Office Action mailed Apr. 27, 2011 in U.S. Appl. No. 11/957,127.

Non-Final Office Action mailed Mar. 8, 2011 in U.S. Appl. No. 11/957,115.

Non-Final Office Action mailed Mar. 25, 2011 in U.S. Appl. No. 11/957,219.

Non-Final Office Action mailed Aug. 17, 2010 in U.S. Appl. No. 12/033,690.

Final Office Action mailed Feb. 1, 2011 in U.S. Appl. No. 12/033,690.

Non-Final Office Action mailed Aug. 17, 2010 in U.S. Appl. No. 12/033,652.

Final Office Action mailed Mar. 18, 2011 in U.S. Appl. No. 12/033,652.

Non-Final Office Action mailed Mar. 29, 2011 in U.S. Appl. No. 12/033,627.

Non-Final Office Action mailed Mar. 30, 2011 in U.S. Appl. No. 11/957,188.

Non-Final Office Action mailed Nov. 19, 2010 in U.S. Appl. No. 11/957,206.

Final Office Action mailed Apr. 21, 2011 in U.S. Appl. No. 11/957,206.

Non-Final Office Action mailed Aug. 23, 2010 in U.S. Appl. No. 11/957,210.

Final Office Action mailed Dec. 13, 2010 in U.S. Appl. No. 11/957,210.

Non-Final Office Action mailed May 3, 2011 in U.S. Appl. No. 11/957,210.

Non-Final Office Action mailed Mar. 30, 2011 in U.S. Appl. No. 11/957,167.

International Search Report with Written Opinion dated Jun. 29, 2009 (PCT/US2008/083543).

International Search Report with Written Opinion dated Jun. 22, 2009 (PCT/US2008/083538).

International Search Report with Written Opinion dated Aug. 24, 2009 (PCT/US2009/030377).

International Search Report with Written Opinion dated Aug. 24, 2009 (PCT/US2009/030380).

\* cited by examiner

ROUTE TRANSFER BETWEEN DEVICES

CROSS-REFERENCE

This application relates to U.S. patent application Ser. No. 11/957,115 entitled "ROUTE MONETIZATION".

This application relates to U.S. patent application Ser. No. 11/957,127 entitled "FEDERATED ROUTE PRODUCTION".

This application relates to U.S. patent application Ser. No. 11/957,139 entitled "DESTINATION AUCTIONED THROUGH BUSINESS OF INTEREST".

This application relates to U.S. patent application Ser. No. 11/957,151 entitled "GENERATIONAL INTELLIGENT NAVIGATION SYNCHRONIZATION OR UPDATE".

This application relates to U.S. patent application Ser. No. 11/957,167 entitled "SOCIAL NETWORK BASED ROUTES".

This application relates to U.S. patent application Ser. No. 11/957,188 entitled "ADDITIONAL CONTENT BASED ON INTENDED TRAVEL DESTINATION".

This application relates to U.S. patent application Ser. No. 11/957,206 entitled "AUTOMATIC SPLICES FOR TARGETED ADVERTISEMENTS".

This application relates to U.S. patent application Ser. No. 11/957,210 entitled "PEDESTRIAN ROUTE PRODUCTION".

This application relates to U.S. patent application Ser. No. 11/957,219 entitled "ROUTE GENERATION BASED UPON ACTIVITY CRITERIA".

TECHNICAL FIELD

The subject specification relates generally to route production and in particular to producing routes along multiple devices

BACKGROUND

Computer-driven automobile route planning applications are utilized to aid users in locating points of interest, such as particular buildings, addresses, and the like. Additionally, in several existent commercial applications, users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a municipality, state/providence, and/or country, proximity of the point of interest to major freeways, proximity of the point of interest to a specific city, and the like.

Furthermore, conventional computer-implemented mapping applications often include automotive route-planning applications that can be utilized to provide users with directions between different locations. Pursuant to an example, a user can provide an automotive route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check box that enables a user to specify that she desires to avoid highways. Similarly, a user can inform the route planning application that she wishes to travel on a shortest route, or a route that takes a least amount of time, or a route that uses a least amount of gasoline (as determined by underlying algorithms). Over the last several years, individuals have grown to rely increasingly on route planning applications to aid them in everything from locating a friend's house to planning cross-country road trips.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventional route production systems generate a route that is disclosed to a user. For instance, while traveling in a vehicle, a user can request directions to a hotel—a direction set is produced upon a vehicle navigation screen that leads the user to a parking garage near the hotel. However, once the user reaches the parking garage, the user typically employs alternate manners to travel from the parking garage to the hotel (e.g., walking). In order to utilize the generated route, the user can write down a route portion, attempt to memorize the route portion, and the like. This can lead to a large likelihood of errors such as incorrectly copying information.

The disclosed innovation allows a route to integrate seamlessly between devices, such as between a vehicle navigation system and a personal electronic device. Using the example from the previous paragraph, as the user exits the vehicle, the route produced upon the vehicle navigation screen can transfer to a user's personal electronic device, such as a cellular telephone. Information related to user travel can be collected and based upon the collected information a device for presentment can be chosen. A route can transfer to a selected device (e.g., be emitted from a presentation device, be collected, transferred from a central server, etc.) and the route is presented to the user.

Many vehicle route generation devices under development can be detachable from the vehicle and carried by a user. Due to the portable features of these devices, little attention has been paid to transfer of routes between devices. The disclosed innovation takes route disclosure in a new direction, allowing routes to be produced on multiple devices based upon contextual factors of a user.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
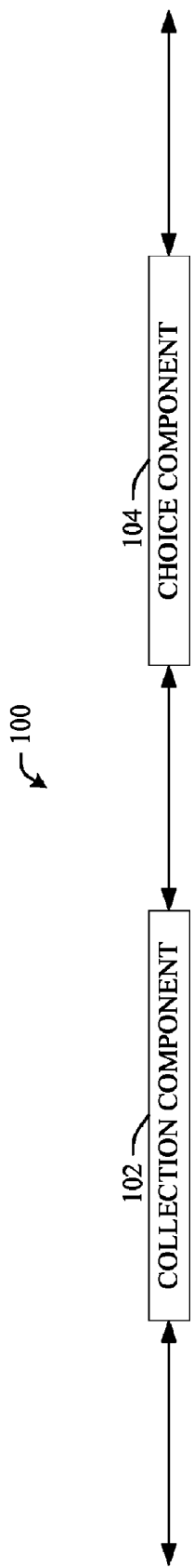
FIG. 1 illustrates a representative device selection system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, an example system 100 is disclosed for choosing at least one device upon which a route is to be presented. Two conventional manners in which to travel with a navigational aid is though a paper direction set or a computer-generated route. A route can be generated at a home computer, printed onto a piece of paper, and carried with a user as the user travels in a vehicle (e.g., an automobile, motorcycle, bicycle, airplane, helicopter, motorboat, self-balancing transportation device, etc.). Common computer-generated routes provide high-quality driving instructions, but poor walking instructions. Some vehicle navigation systems are portable and produce a detailed route that can transition a user between driving, walking, etc. However, the portable system becomes another piece of equipment a user is responsible for—such as in addition to a cellular telephone, pager, portable music player, personal digital assistant, and the like.

The disclosed innovation allows a route to transfer between user devices, thus allowing a user to have improved functionality without being burdened with carrying extra devices. A collection component 102 can obtain information that concerns a group of one or more devices capable of route presentment (e.g., available devices, such as a cellular telephone and vehicle navigation system), user data (e.g., user position), and a route. Information can be obtained from various sources, such as from a personal profile, data stored on a personal device (e.g., contacts on a cellular telephone), and the like.

Obtained information can be accessed by a choice component 104 that selects a device for route presentment from the group of one or more devices capable of route presentment based upon device information, user data, and the route. For instance, the choice component 104 can identify that a user will travel from his home to his vehicle and allow a route to be displayed on both devices. The routes can synchronize with one another, such that a change made to the route upon one device can be represented on other devices. In another embodiment, a singular device is selected to present a route and the route transfers from device to device (e.g., the route is sent to a vehicle system and deleted from a home computer).

In an illustrative instance, a user can intend to take a nature trail at a park that she has never visited. The user can generate a route on a personal computer that includes both driving directions from her home to the park as well as a trail to take once in the park. The collection component 102 can access a user schedule and determine the user plans to travel along the route at 10 AM. At 10 AM, the choice component 104 can designate a vehicle navigation system integrated upon a vehicle radio to present the route to the user. As the user travels along the route, she can park her car at a starting point of the nature trail. The collection component 102 can obtain vehicle operation information of the user (e.g., a vehicle engine has shut off) and the choice component 104 can infer the user is leaving her vehicle and the route should transmit to a personal electronic device. The choice component 104 can analyze available devices to determine at least one device upon which a route should be transmitted. This can be based upon her history (e.g., on nature walks, she commonly brings a watch, but not her cellular telephone), device placement (e.g., her cellular telephone is in a trunk compartment), device status (e.g., she is more likely to use a device that is in an 'on' state), etc. In addition, she can make changes to the route upon one device (e.g., add a stop on her way home) and the change can be represented upon placement on another device.

According to one embodiment, the choice component 104 automatically transfers a route to multiple devices and a device can make a decision on if a route should be accepted, presented, and the like. The choice component 104 can implement with correction capabilities, such that a different selection can be made if it is determined that there is an incorrect election. For example, a cellular telephone can be initially selected—however, if the telephone is in an 'off' position, the choice component 104 could make a new selection of a wristwatch. In addition, different devices can have different functionality used for route presentment. A route can transfer to a cellular telephone and an automotive stereo system, where the cellular telephone displays route images and the stereo system plays voice commands. Alternatively, an automobile navigation screen can show a 'bird's eye' view of the route while a handheld device shows a next turn and a countdown to when/where the turn occurs. In an alternate configuration, the collection component 102 can receive a current location and an intended destination. The system 100 can construct the direction set and the choice component 104 can make the computed direction set available to at least one other device (e.g., a device that transferred the current location or the intended destination).

The system 100 can function to synchronize devices continuously, periodically, and so on. The collection component 102 can operate as a means for maintaining a synchronization connection between a master device and at least one subordinate device. The choice component 104 can implement as a means for updating a route upon at least one connected subordinate device from information upon the master device. The master device can hold the route and the subordinate device can retain local copies of the route. In addition, the master device can be a device controlled by a user while a friend or other party can own/operate the subordinate device. Various security measures can be implemented upon the system 100, such as transferring the route in an encrypted manner, determining if a subordinate device is authorized to receive an update, and the like. Additionally, the master device can gather an intended destination, current location, anticipated location, and so forth (e.g., gathered from the subordinate device), compute a direction set, and transfer the direction set to the subordinate device. The collection component 102, choice component 104, other components of the subject specification, and so on can implement upon the master device as well as other locations.

Figure 2:
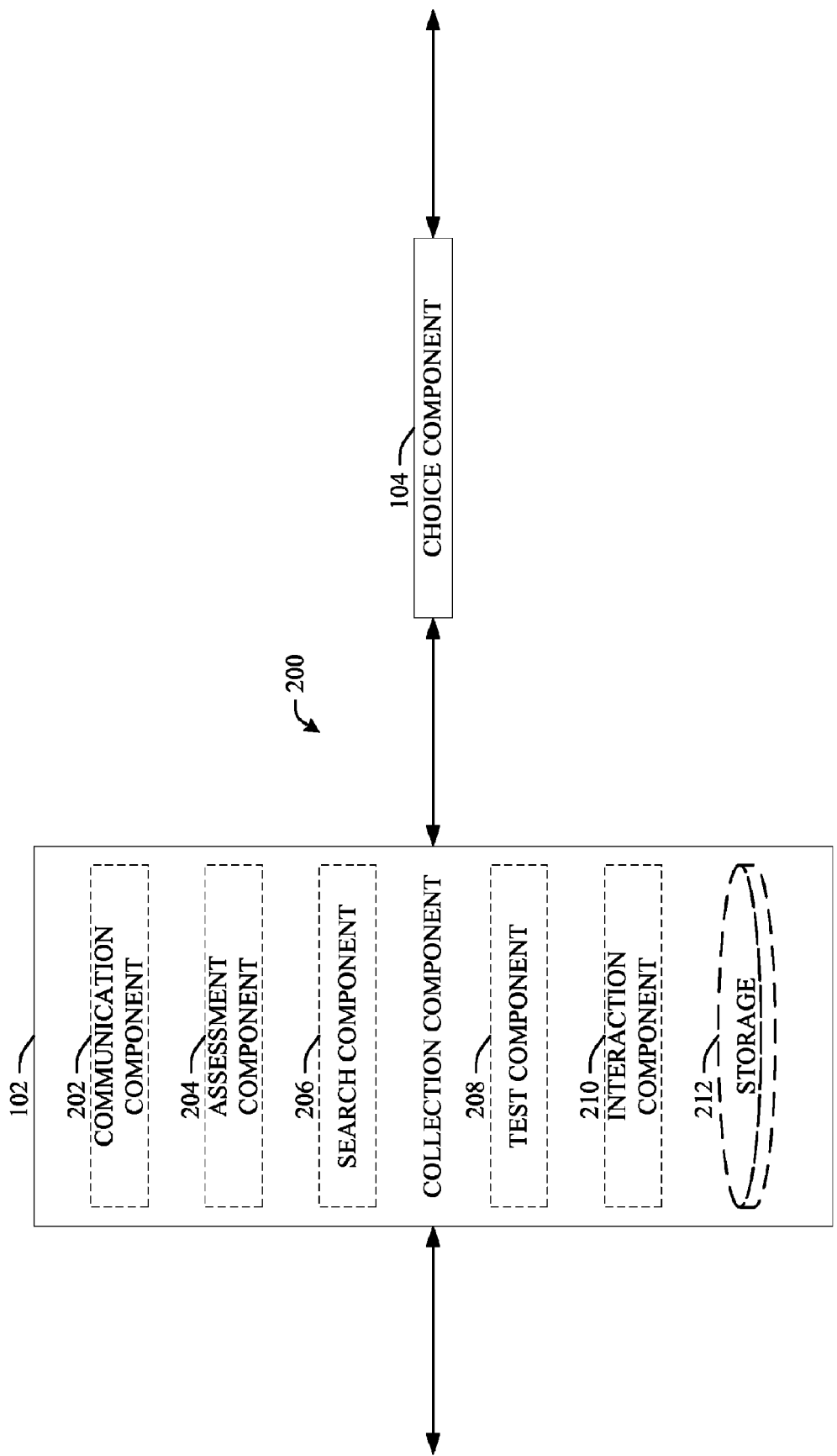
FIG. 2 illustrates a representative device selection system with a detailed collection component in accordance with an aspect of the subject specification.

Now referring to FIG. 2, an example system 200 is disclosed for choosing at least one device upon which a route is to be presented with a representative detailed collection component 102. A communication component 202 can engage with other devices to transfer information (e.g., a route from one device to another), send a request for information, receiving information from an auxiliary source (e.g., access a user personal profile), etc. Operation can take place wirelessly, in a hard-wired manner, employment of security technology (e.g., encryption, authentication, . . . ), etc. Moreover, the communication component 202 can utilize various protective features, such as performing a virus scan on collected data and blocking information that is positive for a virus.

A route can be gathered through use of the communication component 202 and an assessment component 204 can appraise the route to establish when a choice component 104 should make a selection of a device that should disclose a route. For instance, the collection component 102 can obtain information that a user's cellular telephone that holds a route is running low on power and is likely to fail temporarily. The assessment component 204 can determine it is a proper time for choice component 104 to make a selection on a device that should disclose the route once/if the cellular telephone fails (e.g., choose at least one device, choose all devices and a user can elect a device that presents the route). Moreover, the choice component 104 can determine if a device is in an 'on' state. In one scenario, the user can elect a device that is in an 'off' state—the user can change the state from 'off' to 'on' and when the state changes, synchronization can take place (e.g., a route can be transferred).

To engage an information source, a search component 206 can be employed to locate a source that provides information that can be obtained. A source can be a database server, an airway transmission, in incoming electronic message, etc. The search component 206 can retain addresses (e.g., Internet Protocol addresses) of locations that have a history of providing quality information. Moreover, the search component 206 can identify low quality sources (e.g., sources that historically provide inaccurate data) and block information obtainment for such identified sources. The search component 206 can function to extract information from a source, make a copy of information, etc. Moreover, the search component 206 can discover devices capable to disclose a route within set criteria (e.g., when a direction set is disclosed upon a vehicle screen while in-route, devices within a vehicle cabin are searched and a user's home is ignored, since a user's home device is likely of little value). The search component 206 can process discovery results to produce a group of one or more devices capable of route presentment.

Various diagnostic tests can be performed upon discovered devices by a test component 208. Tests can include device capabilities (e.g. determine if a device includes a monitor), device characteristics (e.g., device battery life), and the like. For instance, the test component 208 can check if a device discovered by the search component 206 has a capability to relay route information as audio sounds, which can be important if an anticipated user has a hearing impairment.

A user can specifically make requests as to what device should hold a route that can be gathered by an interaction component 210. The interaction component 210 can collect a user request that specifies a device for route presentment, the choice component 104 selects the user specified device. For instance, the user can input a command that her personal digital assistant always carry a route and that a vehicle navigation system retain her route when she is physically located within a cabin of her vehicle. The interaction component 210 can notify the choice component 104 of the command as well as provide priority data (e.g., a request from a user takes precedence over an estimation).

Different pieces of information, such as obtained information, component operating instructions (e.g., of the search component 206), source location, an original route, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a Redundant Array of Independent Drives configuration).

Figure 3:
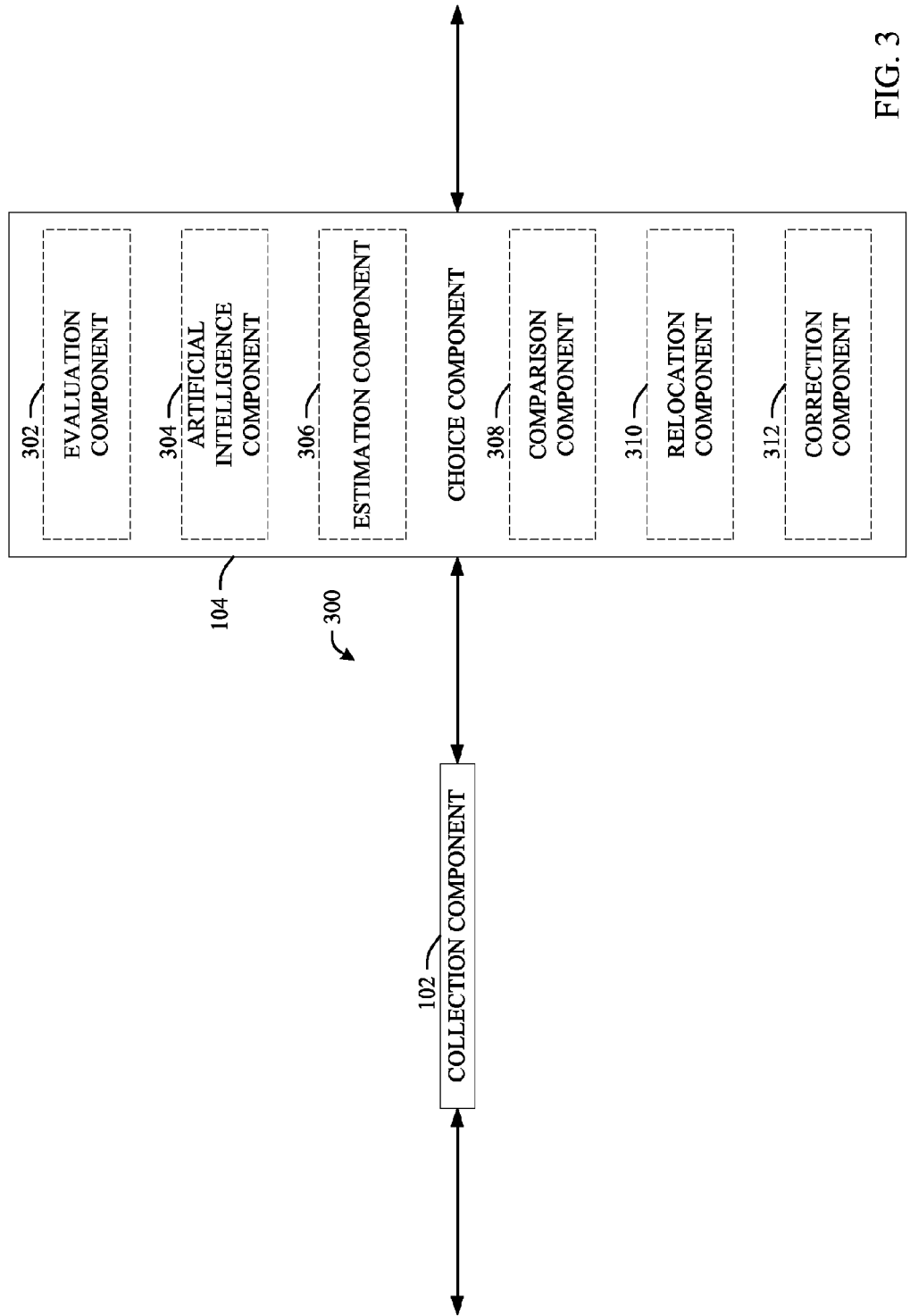
FIG. 3 illustrates a representative device selection system with a detailed choice component in accordance with an aspect of the subject specification.

Now referring to FIG. 3, an example system 300 is disclosed for choosing at least one device upon which a route is to be presented with a representative detailed choice component 104. A collection component 102 can obtain information that concerns a group of one or more devices capable of route presentment, user data, and a route. Based upon device information, user data, and the route, the choice component 104 can select a device for route presentment from the group of one or more devices capable of route presentment.

Details obtained by the collection component 102 (e.g., information that concerns a group of one or more devices capable of route presentment, user data, a route, etc.) can be processed by an evaluation component 302. The evaluation component 302 can analyze a route or a device form the plurality of devices (e.g., perform functions of the test component 208 of FIG. 2), a result of the analysis is used in the device selection. For instance, the evaluation component 302 date determine that a route has portions that would benefit from display upon a color monitor and find devices that can display information in color.

An artificial intelligence component 304 can be employed to make at least one inference or at least one determination in relation to information obtainment or device selection. For instance, the artificial intelligence component 304 can infer that an engine of a vehicle powering down or a global positioning system trail (e.g., a path along a route) signifies the user is to leave the vehicle in a relatively short time. Moreover, the artificial intelligence component 304 can be used to determine if obtained detail are reliable.

Artificial intelligence component 304 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

A device a user will implement can be anticipated and an estimation component 306 can predict a device a user will employ, the prediction is used by the choice component 104 to select the device. For example, a prediction can be made on if a user is likely to become confused along a route. Therefore, a device should likely be selected that supplies an appropriate amount of route detail (e.g., a device with a relatively large screen). The estimation component 306 can also make device predictions, such as what devices a user will carry when he leaves his vehicle.

Devices can be contrasted against one another to determine a device that should be selected by a comparison component 308. Common operation of the comparison component 308 ranks devices based upon a plethora of criteria and the choice component 104 selects a device with a highest rank. It is to be appreciated that the choice component 104 can select more than one device as well as all devices in a group. Devices can be operated/owned by different users, thus routes can transfer between different users. In an illustrative instance, a person can send a broad message to anyone within a given area that they are lost and would like a route to a destination. The message can be received by the collection component 102 and the choice component 104 can decide if a route should be transferred to the requestor. According to one embodiment, various security measures can be implemented, such as disclosing the route to the requester, but not disclosing a current location of the user.

At least a portion of a route can be transferred to a selected device though use of a relocation component 310. In addition, the relocation component 310 can transfer instructions, such as a format in which to present the route. Transfer of the route can include sending the route to the selected device, sending a copy of the route to the selected device, making the route accessible to the selected device, sending a start and end location for calculation of a route on the selected device, etc. Transferring the route can include emitting a series of images to another device or storage card that details the route, thus allowing virtually any electronic device to display route information.

It is possible that incorrect assumptions are made in selecting a device for presentment. A correction component 312 can monitor user or device activity and initiate new selection actions based upon additional data (e.g., data that a selection was incorrect, poor, etc.). For instance, a prediction can be made that a user will carry his cellular telephone on a nature walk and the cellular telephone is the selected device. However, if the user does not take his cellular telephone, then the choice component 104 can make a new selection.

Figure 4:
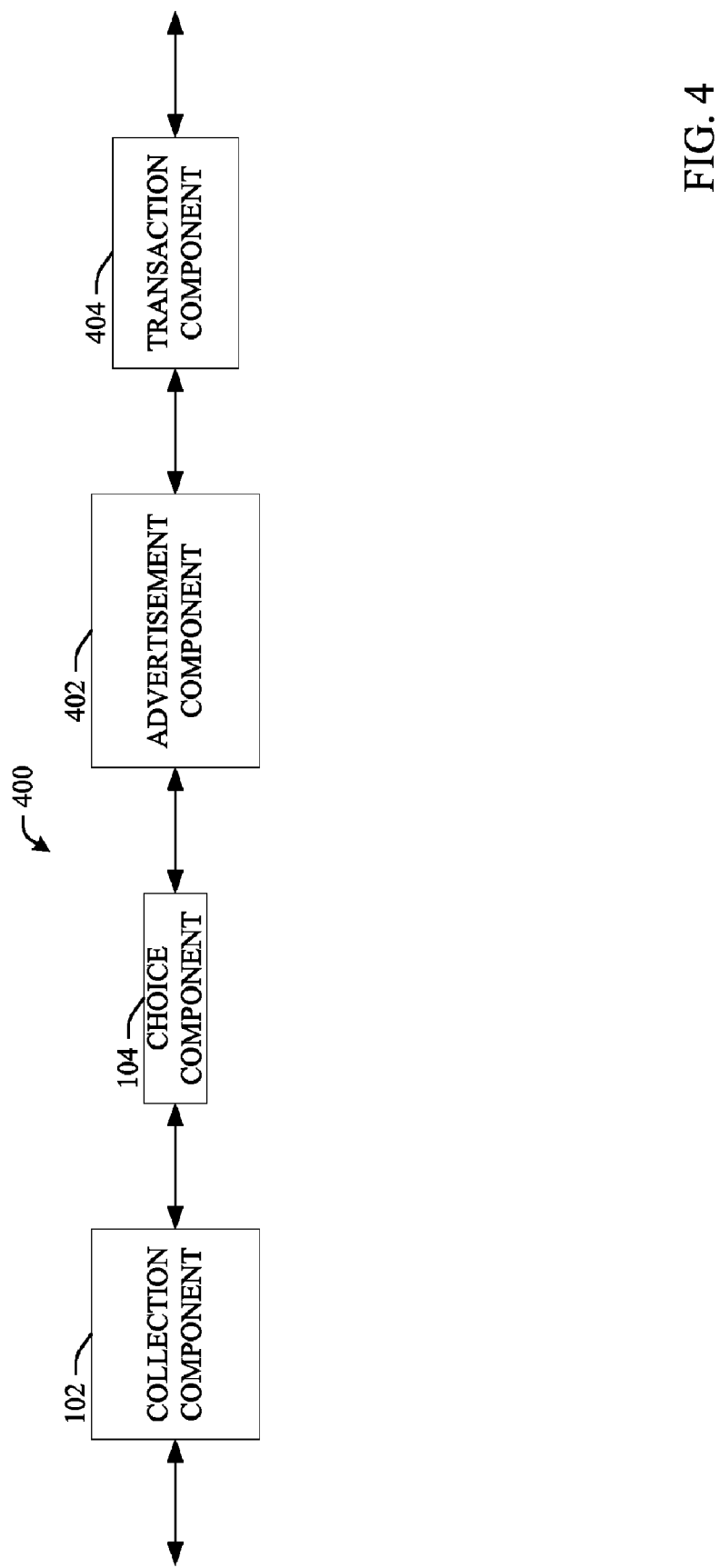
FIG. 4 illustrates a representative device selection system with an advertisement component and transaction component in accordance with an aspect of the subject specification.

Now referring to FIG. 4, an example system 400 is disclosed for choosing at least one device upon which a route is to be presented with an advertisement component 402 and transaction component 404. A collection component 102 can obtain information that concerns a group of one or more devices capable of route presentment, user data, and a route. Based upon device information, user data, and the route, a choice component 104 can select a device for route presentment from the group of one or more devices capable of route presentment. The choice component 104 can utilize a relocation component 310 of FIG. 3 that can transfer the route to the selected device, the selected device can disclose the presented route.

There can be a disclosure of a commercial detail (e.g., an announcement for a product or service) that can integrate with a route. An advertisement component 402 can associate a commercial detail with a portion of the route, the route associated with the commercial detail transfers to the selected device. For instance, when a route is disclosed upon a vehicle device, a fuel station commercial detail can be played. However, when a route is presented on a personal device as a user walks down a street, a commercial detail can be shown to encourage the user to window shop.

If a user performs a function in response to a commercial detail, then a party can be compensated (e.g., an advertisement service host). A transaction component 404 can augment an entity with a reward based upon a user performing a function that relates to the associated commercial detail. For instance, a commercial detail can instruct a user to stop at a coffee shop to purchase a coffee drink. If the user does stop at the coffee shop or purchase a coffee drink, then an entity associated with the system 400 (e.g., monthly provider) can be compensated. In this instance, once price can be paid for the user stopping and another price paid for a purchase.

The transaction component 404 can employ revenue sharing in relation to advertisement disclosure. In an illustrative instance, a single route-associated advertisement can be published through a vehicle disclosure device as well as a cellular telephone. The transaction component 404 can allocate a portion of revenue (e.g., balanced allocation, weighted allocation, and the like) from an advertiser to a vehicle disclosure device maker, to a cellular telephone manufacturer, an operator of the system 400, etc.

The transaction component 404 can perform a reward operation (e.g., financial or non-financial) in relation to information obtainment or device selection. The transaction component 404 can perform actions to meet constraints, such as debiting a user account and crediting a provider account. While fiscal amounts are commonly transacted, it is to be appreciated that other commodities can be exchanged, such as coupons, meeting of contractual obligations (e.g., canceling of a task to be performed), tax credits, etc.

Moreover, a reward function can take place in relation to user response to a commercial detail. For example, an advertisement can be played that a user should stop at a highway exit for a cup of coffee. If the user takes the exit, buys the cup of coffee, buys a different item, etc., then payments of varying amounts can be made to an advertisement hosting service.

Figure 5:
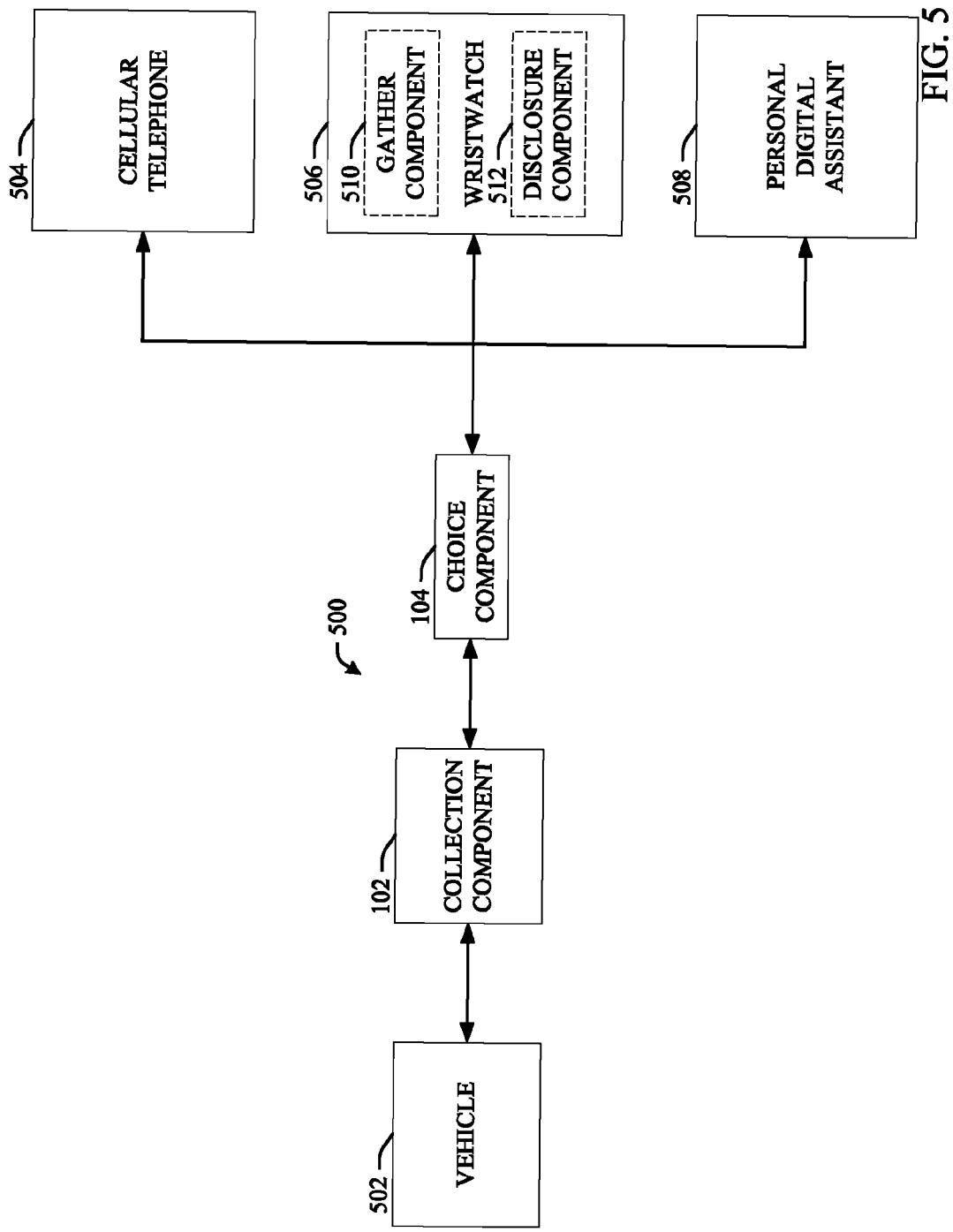
FIG. 5 illustrates a representative route transfer configuration in accordance with an aspect of the subject specification.

Now referring to FIG. 5, an example system 500 is disclosed for transferring a direction set between devices. A central server can hold a route and transfer the route to different locations. For instance, initially, a route can transfer to a vehicle 502 and be presented upon a vehicle display screen. Moreover, a navigation system of the vehicle 502 can generate a route (e.g., through viewing user history and anticipating a user intended destination) and the generated route can be uploaded to the central server or retained in vehicle 502 storage. Route generation can be centralized (e.g., one device/machine is appointed to generate and distribute the route), completely distributed (e.g., each capable machine tries to generate the route), semi-distributed (e.g., there is an appointed master route generator, which is automatically replaced by a next powerful machine if a response 'times out'), and the like.

A collection component 102 can obtain information that concerns a group of one or more devices capable of route presentment, user data, and a route. Based upon device information, user data, and the route, a choice and distribution component 104 can selects a device or devices for route presentment from the group of one or more devices capable of route presentment.

In the disclosed system 500, three possible devices are disclosed: a cellular telephone 504, a wristwatch 506, and a personal digital assistant 508. It is to be appreciated that other devices can be implemented aside for the disclosed three, such as a laptop computer. In one embodiment, the choice component 104 selects the wristwatch 506 for disclosing a route. This can be in addition to selecting the cellular telephone 504 or personal digital assistant 508 as well as sole selection of the wristwatch 506.

The devices 504, 506, and 508, as well as the vehicle 502 can configure with a gather component 510 that collects a route for disclosure. The gather component 510 can function as a means for gathering a route disclosed upon a first presentment device (e.g., a disclosure component of the vehicle 502). Gathering the route can include extracting the route, retaining a copy of the route, etc. In one configuration, one of the first presentment device or subsequent presentment device is a vehicle device (e.g., enacted upon the vehicle 502, such as a in-vehicle navigation system) and one of the first presentment device or subsequent presentment device is a personal electronic device (e.g., the cellular telephone 504, the wristwatch 506, the personal digital assistant 508, etc.)

A disclosure component 512 can provide the route to a user (e.g., operating a vehicle passenger or operator, as a pedestrian, etc.). A non-exhaustive list of disclosure components include a display screen, touch screen, speaker system, virtual reality environment, Braille production system, printer, etc. In addition, the disclosure component 512 can present information in multiple formats, such as showing a video with audio capabilities. Other components can implement upon the devices 504, 506, and 508 or the vehicle 502, such as a formatting component that modifies the route in order to improve presentment upon the disclosure component 512. Other components can be utilized in conjunction with devices 504, 506, or 508 or the vehicle 502, such as a global position component that tracks user location, and alteration component that changes what is presented on the disclosure component 512 based upon user location, a layout component that formats a route for presentment upon the disclosure component 512, and the like.

Figure 6:
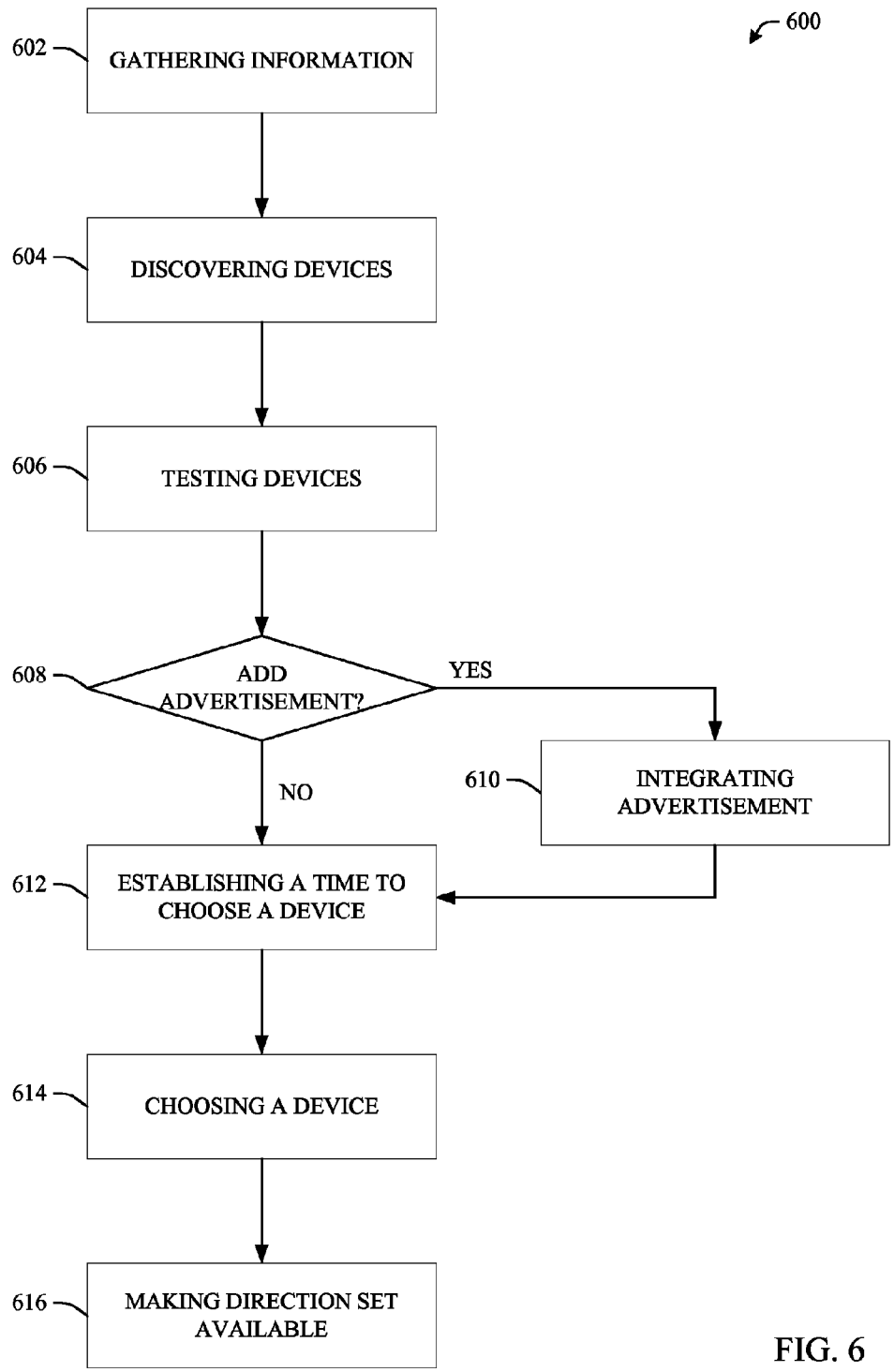
FIG. 6 illustrates a representative route transfer methodology in accordance with an aspect of the subject specification.

Now referring to FIG. 6, an example methodology 600 is disclosed to make a direction set available to a device. Initially information related to a route, user activity, device characteristics, and the like could be gathered at event 602. Gathering information can include making copies of relevant information that is retained in storage, reading information off a remote storage device, etc.

Devices capable of disclosing a route can be discovered at action 604. A scan can take place along a locality that identifies devices capable of communication. For example, messages can be sent out globally along an area requesting a response if a device can disclose a direction set—devices that positively respond can be considered discovered devices. In one embodiment, a device list is retained in storage (e.g., portable devices commonly located in a vehicle) and the device list is analyzed at action 604.

Discovered devices can be tested in order to determine if the devices are capable of presenting a route at act 606. A device can state it includes capabilities to disclose a route; however, it is possible that the device does not specific needs of a situation. For instance, a device can present a route upon a screen, but the route cannot be disclosed in color. If important route information is shown through varying colors, then the device will commonly fail and not be used to disclose the route.

A check 608 can take place to determine if an advertisement is to be integrated into a route. Commonly, advertisements attempt to convince a user to purchase a product or use a service. When disclosed in relation to a route, the advertisement can relate to a possible waypoint near the route (e.g., a restaurant off a highway exit) or near an intended destination.

If the check 608 makes a positive determination, then an advertisement can be integrated into the route at action 610. Integration allows the advertisement to be disclosed at an opportune time (e.g., a time when the advertisement has a high chance of being effective). The integration can include adding a procedure that if a user takes an action in accordance with an advertisement (e.g., takes a particular exit), then an advertisement hosting service can be compensated.

If the check 608 makes a negative determination or an advertisement is added, then at block 612 a time to choose a device is established. Selecting a device for route presentment can consume a relatively high amount of resources (e.g., processing time). Therefore, operation of block 612 allows selection to take place at times that are appropriate. In one embodiment, a user signifies when selection should take place; however, selection can take place automatically without user request.

At event 614, a device for route disclosure can be selected, commonly at a time chosen at block 612. A relatively large number of devices can be available to present a route to a user. In one example, a user can own a wristwatch and a cellular telephone that are both capable of presenting a direction set. If the user leaves a vehicle with the wristwatch, but not the cellular telephone, then the wristwatch would likely be selected to present the route. In one instance, multiple devices can be selected (e.g., a cellular telephone and a wristwatch), a route can be sent to the devices and a user elects a device for presentment.

A direction set can be made available to a chosen device at event 616. A device can be allowed to access a direction set that is retained in local storage or the direction set can be directly transmitted to a device. Moreover, a password can be provided that allows a personal electronic device to access the direction set from a remote server (e.g., a home computer).

Figure 7:
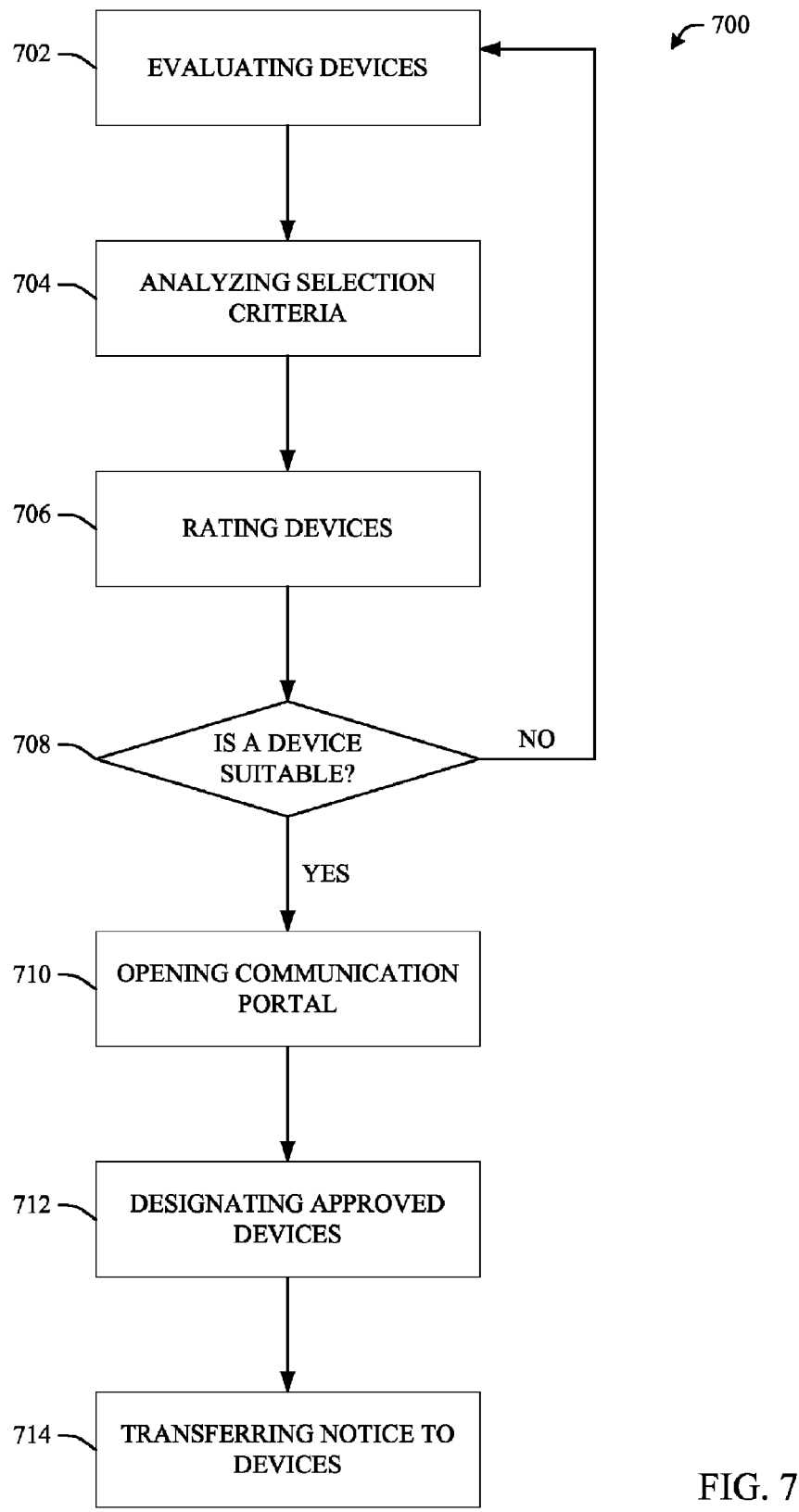
FIG. 7 illustrates a representative methodology for device selection and allowing for direction set presentment in accordance with an aspect of the subject specification.

Now referring to FIG. 7, an example methodology 700 is disclosed for choosing a device and making a direction set available to the chosen device, which can be implemented as events 614 and 616 of FIG. 6. Different characteristics of devices can be evaluated at action 702. For example, a user can prefer to use one device to another and action 702 can learn of the user preferences.

Criteria for selection can be analyzed through act 704. Contextual information can be known, such as a user will travel alone and at night in an unfamiliar area. Therefore, highly important selection criteria can be that devices are well lit and allow a user to see the direction set easily. In addition, non-route criteria can be evaluated, such as that a device includes a security light for use in case of an emergency. A comparison can be made between the direction set and the available devices.

At block 706, the devices can be ordered in a priority list from most to least desirable for presentment. Devices that a user prefers using can be provided a higher rating as well as devices that meet much of the selection criteria. In addition, comparison results can be used to rank the devices and different selection criteria or device capabilities can be weighted.

Based upon device ratings, a check 708 can be made if there is a suitable device for presentment. For instance, if no device has a well lit display screen (e.g., a screen is not bright enough according to a threshold), then a notice can be sent to the user explaining that a suitable device could not be found. However, other configurations can be implemented, such as a determination is made if there is a device that can visually present a route—if a device cannot be found, then a check occurs to determine if there is a device where audio presentment is available. If a suitable device cannot be found, then device evaluation can continue at action 702 for newly discovered devices.

Event 710 allows for a communication portal between devices (e.g., between a personal electronic device and a central server) to be open. A communication portal can enable a device to access information related to a direction set, including the direction set. The portal can configure with various protective measures, such as using encryption.

A device appropriate for disclosing a route can be designated at act 712. Devices rated at block 706 can be provided a score and a comparison can be made between device scores and a set threshold score. If a device has a score equal to or above the threshold, then the device can be designated to present a route. In one embodiment, a highest scoring device is selected (e.g., or two highest scoring, three highest scoring, etc.)

At block 714, a notice can be transmitted to a designated device that a route is ready for presentment. The notice can include the direction set as well as instructions on how to access the direction set. For instance, the notice can state that a direction set for presentment is located at X location (e.g., providing an Internet Protocol address) and should have Y characteristics (e.g., be formatted in color).

Figure 8:
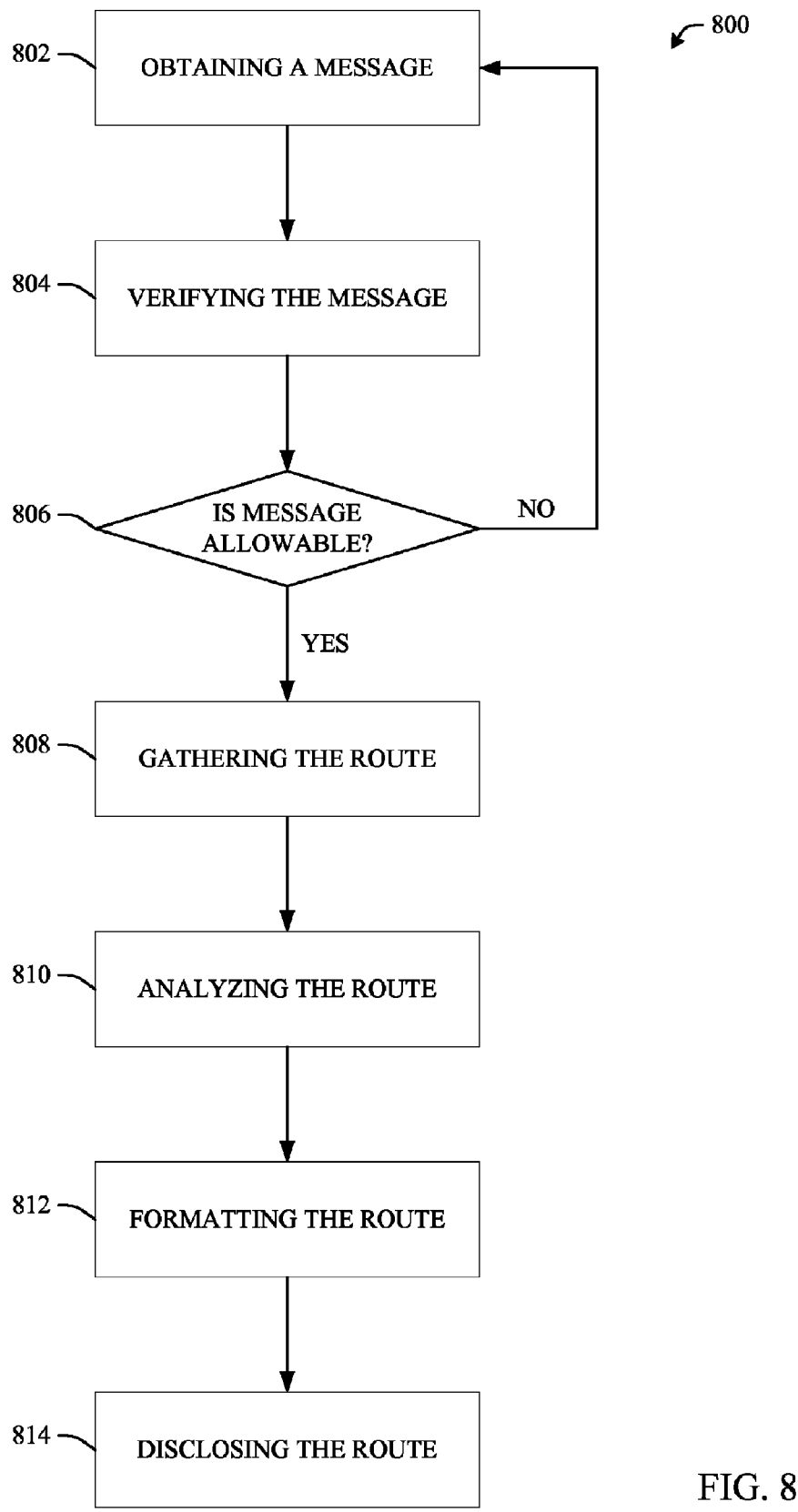
FIG. 8 illustrates a representative operation methodology in accordance with an aspect of the subject specification.

Now referring to FIG. 8, an example methodology 800 is disclosed for device operation concerning disclosing a route. A message can be obtained at block 802 that a route is ready for disclosure; commonly, the message can originate from block 714 of FIG. 7. Security features can implement with obtaining the message, such as checking a notice for viruses.

A message that is obtained can be verified at action 804 to determine if further actions should take place. For instance, a vehicle device can associate with a family; however, a mother and father of the family can have routes displayed while children cannot. Therefore, if a route message is for a child to take a particular route, the message can be denied.

A check 806 can determine if a message is allowable. For example, a user can be on an important cellular telephone call; it would be harmful to the user to stop the call to obtain a route, so the route is not gathered. A cancellation message can be transferred to a sender and the methodology 800 can return to obtaining messages 802. If a message is not allowable, then no further actions can take place and the methodology 800 can obtain a new message at block 802.

If the check determines the message is allowable, a route can be gathered at action 808. Gathering of the route can include making a copy of the route as well as extracting the route from an auxiliary location (e.g., a previously presented route). Messages can be sent between a device operating the methodology 800 and a system, such as if a route was successfully received, if the route can be displayed, etc.

The gathered route can be analyzed at event 810. A route can have attributes that can be taken into account when formatting or presenting a route. For example, a route with a high level of detail should commonly be disclosed at a higher resolution. Moreover, a consistency check can take place to ensure a route does not include errors (e.g., take a user on a non-existent route).

At block 812, the route can be formatted, commonly based upon analysis results. Formatting can include changing color of a route, altering a route to fit within screen dimensions, placing signals that when a user reaches a point in a route, that the route should be zoomed, etc. Checks can be made to ensure formatting has not erased or modified route information (e.g., critical route information).

The route can be disclosed to the user at action 814, typically using the formatting performed at block 812. For instance, a route can be presented upon a screen, verbal directions can be played, and the like. A determination can be made on how a device should present information. For instance, if a user is blind, then it makes little sense to use a visual display and it can be determined that an audio display should be implemented.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
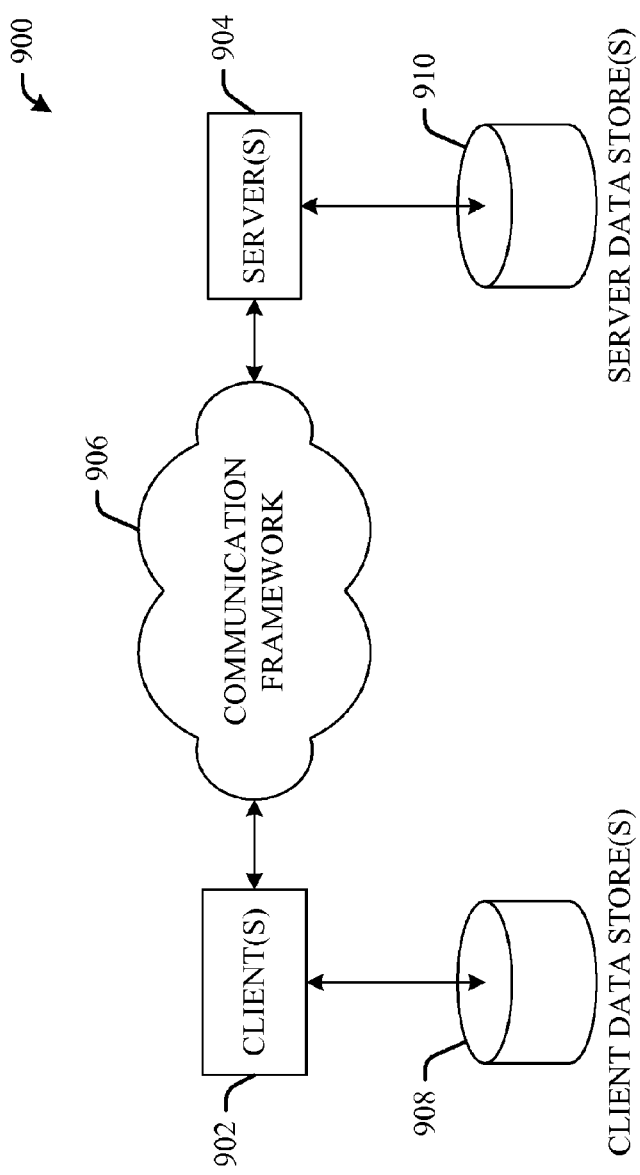
FIG. 9 illustrates an example of a schematic block diagram of a computing environment in accordance with the subject specification.
Figure 10:
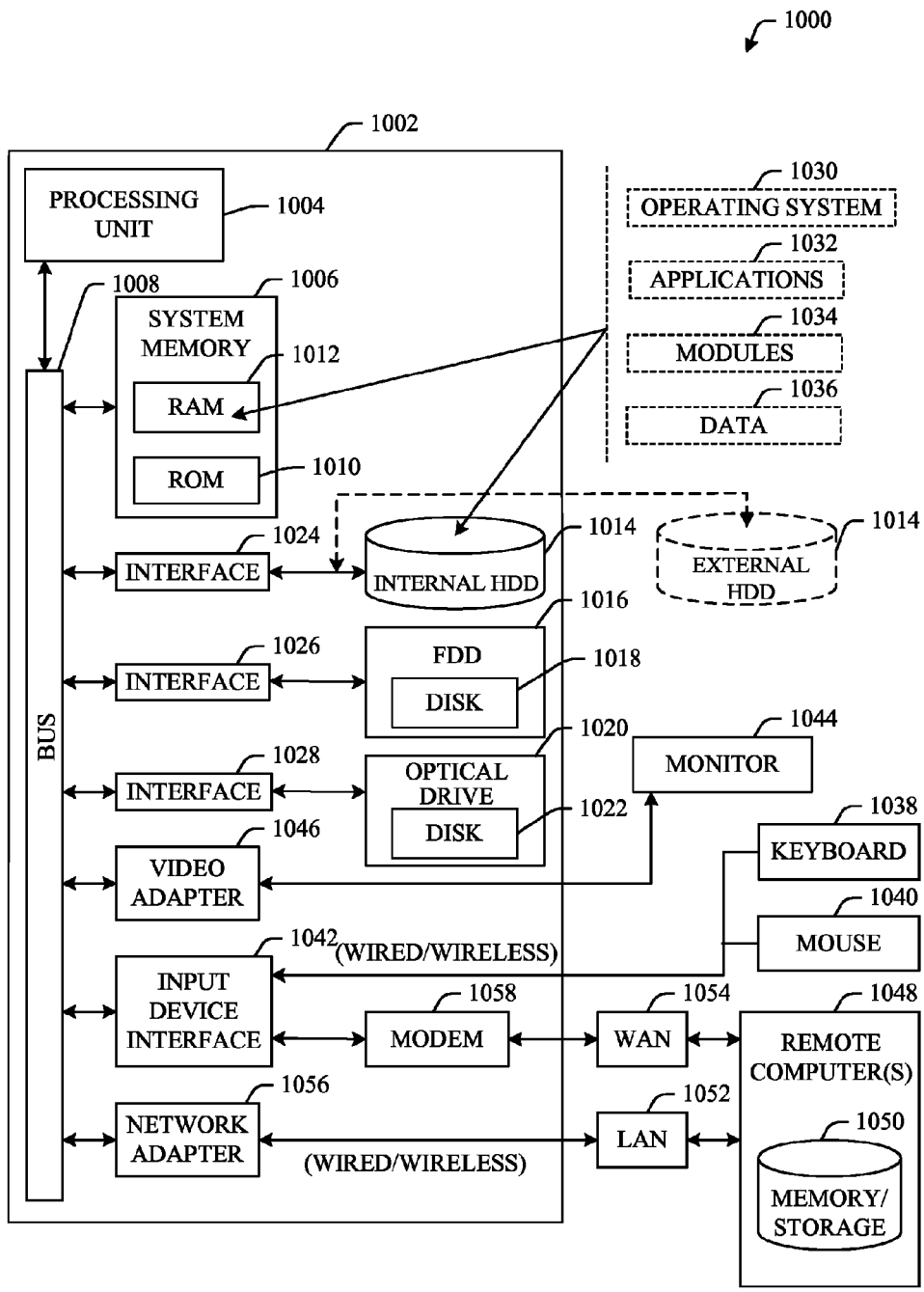
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   gathering information related to a direction set;
   choosing a device, based on the gathered information, from a group of at least one device for disclosing a direction set;
   making the direction set available to the chosen device for disclosure; and
   transferring at least a portion of the direction set to a second device, the second device being inferred based on at least one of history, device placement, or device status.

2. The method of claim 1, further comprising establishing a time when the device should be chosen, the device is chosen at the established time.

3. The method of claim 1, further comprising integrating an advertisement upon the direction set, the direction set integrated with the advertisement is made available to the chosen device.

4. The method of claim 1, further comprising testing at least one device from the group of at least one device, a result of the testing is used in choosing the device.

5. The method of claim 1, further comprising discovering at least one device capable of disclosing the direction set, the group of at least one device for disclosing a direction set includes at least one discovered direction set.

6. The method of claim 1, the direction set is retained upon remote storage.

* * * * *